(12) United States Patent
Spies et al.

(10) Patent No.: US 8,280,760 B1
(45) Date of Patent: Oct. 2, 2012

(54) GENERATING PRICING ESTIMATES

(75) Inventors: J.W.M. Spies, Mountain View, CA (US); Wendy Ann Castleman, San Jose, CA (US); Arthur Andrew Pawlak, Pleasanton, CA (US); Pranay Kapadia, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 231 days.

(21) Appl. No.: 12/772,038

(22) Filed: Apr. 30, 2010

(51) Int. Cl.
*G06Q 10/00* (2006.01)

(52) U.S. Cl. ..................................... 705/7.35

(58) Field of Classification Search .................. None
See application file for complete search history.

(56) References Cited

U.S. PATENT DOCUMENTS

| | | | | |
|---|---|---|---|---|
| 5,664,115 A * | 9/1997 | Fraser | 705/37 |
| 5,842,178 A * | 11/1998 | Giovannoli | 705/26.4 |
| 5,878,400 A * | 3/1999 | Carter, III | 705/20 |
| 6,584,451 B1 * | 6/2003 | Shoham et al. | 705/37 |
| 7,013,290 B2 * | 3/2006 | Ananian | 705/26.42 |
| 7,133,834 B1 * | 11/2006 | Abelow | 705/7.32 |
| 7,181,419 B1 * | 2/2007 | Mesaros | 705/26.2 |
| 7,269,569 B2 * | 9/2007 | Spira et al. | 705/7.36 |
| 7,302,429 B1 * | 11/2007 | Wanker | 1/1 |
| 7,430,561 B2 * | 9/2008 | Bailey et al. | 1/1 |
| 7,483,883 B2 * | 1/2009 | Barth et al. | 1/1 |
| 7,593,871 B1 * | 9/2009 | Mesaros | 705/26.2 |
| 7,647,300 B2 * | 1/2010 | Nevill-Manning et al. | 707/706 |
| 7,660,822 B1 * | 2/2010 | Pfleger | 707/999.107 |
| 7,668,811 B2 * | 2/2010 | Janssens et al. | 707/999.003 |
| 7,689,463 B1 * | 3/2010 | Mesaros | 705/26.5 |
| 7,693,748 B1 * | 4/2010 | Mesaros | 705/26.42 |
| 7,774,331 B2 * | 8/2010 | Barth et al. | 707/706 |
| 7,979,457 B1 * | 7/2011 | Garman | 707/768 |
| 8,001,013 B2 * | 8/2011 | Serbanescu | 705/26.4 |
| 2002/0052769 A1 * | 5/2002 | Navani et al. | 705/7 |
| 2002/0087496 A1 * | 7/2002 | Stirpe et al. | 706/45 |
| 2002/0165771 A1 * | 11/2002 | Walker et al. | 705/14 |
| 2002/0169658 A1 * | 11/2002 | Adler | 705/10 |
| 2002/0188527 A1 * | 12/2002 | Dillard et al. | 705/27 |
| 2003/0028451 A1 * | 2/2003 | Ananian | 705/27 |
| 2003/0115111 A1 * | 6/2003 | Fisher | 705/26 |
| 2003/0130983 A1 * | 7/2003 | Rebane | 707/1 |
| 2003/0172008 A1 * | 9/2003 | Hage et al. | 705/28 |
| 2004/0133526 A1 * | 7/2004 | Shmueli et al. | 705/80 |

(Continued)

OTHER PUBLICATIONS

Google Product Search, "About Google Product Search", http://www.google.com/products/intl/en_us/about.html, Jan. 1, 2007, 3 pages.

*Primary Examiner* — Lynda Jasmin
*Assistant Examiner* — Brett Feeney
(74) *Attorney, Agent, or Firm* — Osha Liang LLP

(57) ABSTRACT

A method for generating a pricing estimate involves displaying a graphical user interface (GUI) to obtain and display data associated with the pricing estimate, receiving items of the pricing estimate receiving a request to generate the pricing estimate, and obtaining, in response to receiving the request, pricing data for the items from a pricing server collecting pricing data from suppliers. The method further involves accessing a pricing rule relating to items of the pricing estimate, applying the pricing rule to the pricing data for the items to obtain adjusted pricing data, populating the GUI with the adjusted pricing data, calculating a total estimated cost based on adjusted pricing data and displaying the total estimated cost within the GUI.

20 Claims, 5 Drawing Sheets

U.S. PATENT DOCUMENTS

| | | | |
|---|---|---|---|
| 2004/0262381 A1* | 12/2004 | Mesaros | 235/380 |
| 2006/0167864 A1* | 7/2006 | Bailey et al. | 707/3 |
| 2008/0154625 A1* | 6/2008 | Serbanescu | 705/1 |
| 2008/0154731 A1* | 6/2008 | Mesaros | 705/14 |
| 2008/0294996 A1* | 11/2008 | Hunt et al. | 715/739 |
| 2009/0030829 A1* | 1/2009 | Chatter et al. | 705/37 |
| 2009/0076927 A1* | 3/2009 | Sridhar et al. | 705/26 |
| 2009/0099901 A1* | 4/2009 | Sah et al. | 705/10 |
| 2009/0150343 A1* | 6/2009 | English et al. | 707/3 |
| 2009/0307145 A1* | 12/2009 | Mesaros | 705/80 |
| 2010/0042478 A1* | 2/2010 | Reisman | 705/10 |
| 2011/0004515 A1* | 1/2011 | Mesaros | 705/14.23 |
| 2011/0137730 A1* | 6/2011 | McCarney et al. | 705/14.58 |
| 2011/0145039 A1* | 6/2011 | McCarney et al. | 705/7.32 |

* cited by examiner

Pricing Estimate for Construction Job #56734

Line Item 1
302
Concrete--Materials

Quantity 1
304
500 lbs

Price 1
306
?

Line Item 2
308
Renting a front-end loader—Equipment Rental

Quantity 2
310
1 day

Price 2
312
?

Pricing Rule
314
Increase price by 20% for materials but not equipment rental

Find Cost/Price
316

Send to Customer
317

Total Estimated Cost 318
?

FIG. 3A

Pricing Estimate for Construction Job #56734

Line Item 1
302: Concrete--Materials
- Quantity 1 304: 500 lbs
- Price 1 306: $75
- Adjusted Price 1 307: $90

Line Item 2 308: Renting a front-end loader--Equipment Rental
- Quantity 2 310: 1 day
- Price 2 312: $510
- Adjusted Price 2 313: $510

Pricing Rule 314: Increase price by 20% for materials but not equipment rental

Find Cost/Price 316 | Send to Customer 317 | Total Estimated Cost 318: $600

FIG. 3B

GENERATING PRICING ESTIMATES

BACKGROUND OF INVENTION

Pricing is essential to all businesses. If goods or services are priced too high, then too few will sell; if goods or services are priced too low, then the business may fail for lack of profits. In some businesses, pricing is relatively simple. For example, in a grocery store each individual item may be sold a set price and the price of all items an individual wishes to purchase are added together to determine the final cost of an individual's purchase. However, in other businesses, pricing is more complex. For example, in some businesses a quote or pricing estimate combining many goods and/or services varying in price and from different suppliers must first be given to a potential customer before the customer agrees to enter into a business transaction. The construction business is an example of a business that may frequently need to provide estimates although one can appreciate that many other businesses operate with a similar procedure.

The process of providing a price estimate involves the need to combine the prices of many different goods and/or services and offer a competitive price, while maintaining an acceptable profit margin. During the estimation process, goods frequently change prices so the person making the estimate may not be in possession of up-to-date pricing.

SUMMARY OF INVENTION

In general, in one or more aspects, the invention relates to a method for generating a pricing estimate. The method comprises: displaying, by a financial application executing on a processor, a graphical user interface (GUI) configured to obtain and display data associated with the pricing estimate, receiving one or more line items of the pricing estimate, wherein the one or more line items require pricing information, receiving a request to generate the pricing estimate, obtaining, in response to receiving the request, a plurality of pricing data for the one or more line items from a pricing server collecting the plurality of pricing data from a plurality of suppliers, accessing a pricing rule relating to at least the one or more line items of the pricing estimate, applying the pricing rule to the plurality of pricing data for the one or more line items to obtain a plurality of adjusted pricing data, populating the GUI with at least the plurality of adjusted pricing data, and calculating, by the financial application, a total estimated cost based on the plurality of adjusted pricing data and displaying the total estimated cost within the GUI.

In general, in one or more aspects, the invention relates to a computer readable storage medium storing a plurality of computer executable instructions for executing on a processor. The plurality of computer executable instructions comprise functionality to: display a graphical user interface (GUI) configured to obtain and display data associated with the pricing estimate, receive one or more line items of the pricing estimate, wherein the one or more line items require pricing information, receive a request to generate the pricing estimate, obtain, in response to receiving the request, a plurality of pricing data for the one or more line items from a pricing server collecting the plurality of pricing data from a plurality of suppliers, access a pricing rule relating to at least the one or more line items of the pricing estimate, apply the pricing rule to the plurality of pricing data for the one or more line items to obtain a plurality of adjusted pricing data, populate the GUI with at least the plurality of adjusted pricing data, and calculate, by the financial application, a total estimated cost based on the plurality of adjusted pricing data and displaying the total estimated cost within the GUI.

In general, in one or more aspects, the invention relates to a system for generating a pricing estimate. The system comprises: a pricing server configured to collect and provide a plurality of pricing data from a plurality of suppliers; and a client device comprising a processor configured to execute a financial application with functionality to: display a graphical user interface (GUI) configured to obtain and display data associated with the pricing estimate, receive one or more line items of the pricing estimate, wherein the one or more line items require pricing information, receive a request to generate the pricing estimate, obtain, in response to receiving the request, a plurality of pricing data for the one or more line items from the pricing server, access a pricing rule relating to at least the one or more line items of the pricing estimate, apply the pricing rule to the plurality of pricing data for the one or more line items to obtain a plurality of adjusted pricing data, populate the GUI with at least the plurality of adjusted pricing data, and calculate, by the financial application, a total estimated cost based on the plurality of adjusted pricing data and displaying the total estimated cost within the GUI.

Other aspects and advantages of the invention will be apparent from the following description and the appended claims.

BRIEF DESCRIPTION OF DRAWINGS

FIGS. 3A and 3B show an example use of the method in accordance with one or more embodiments of the invention.

DETAILED DESCRIPTION

Figure 1:
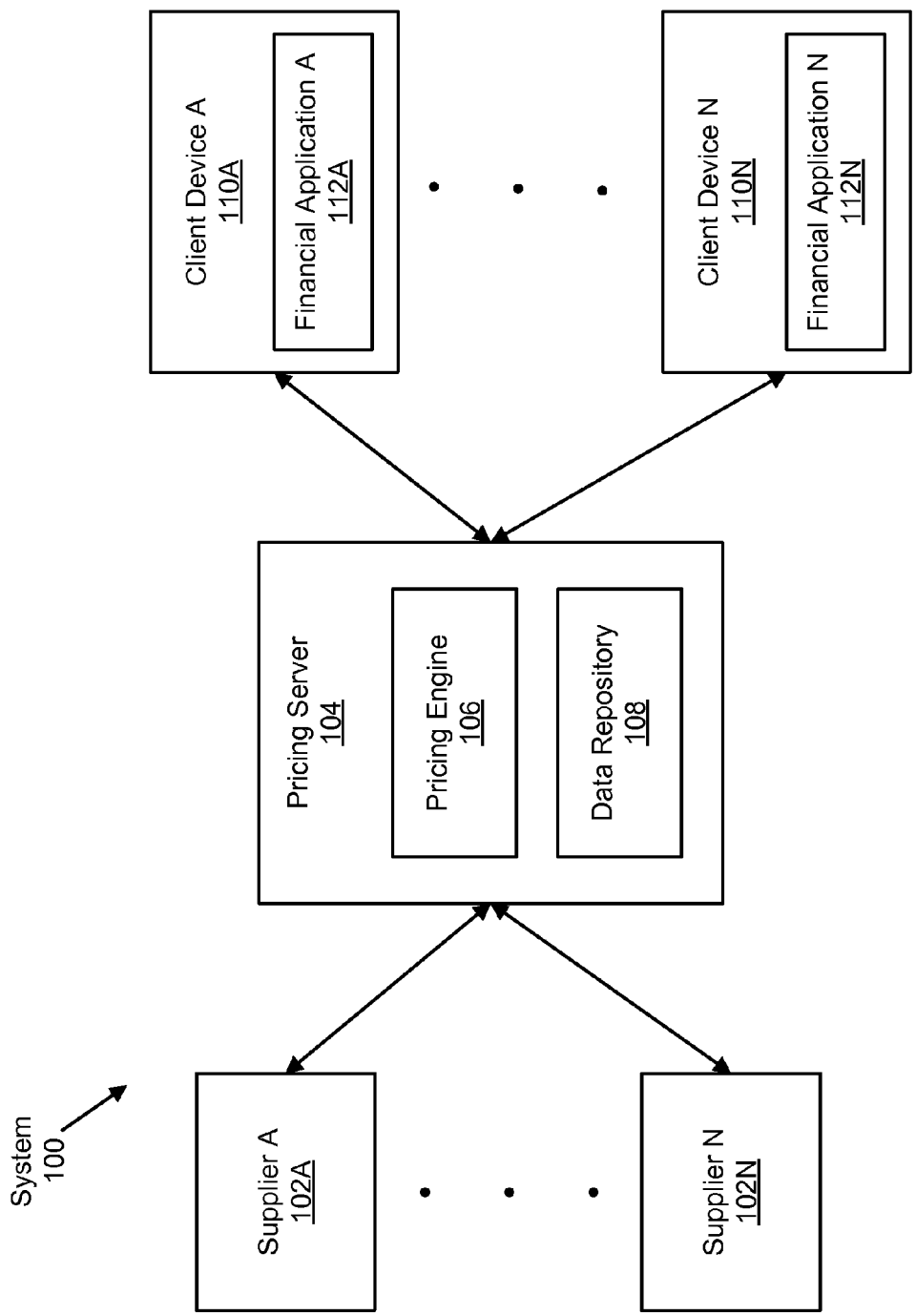
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more through understanding of the invention. However, it will be apparent to one of ordinary skill in the art that the invention may be practiced without these specific details. In other instances, well-know features have not been described in detail to avoid unnecessarily complicating the description.

In general, embodiments of the invention provide a method, computer readable storage medium, and system for generating a pricing estimate. Specifically, in one or more embodiments of the invention, items to be priced (as line items) in a pricing estimate and pricing rules to be used in generating a pricing estimate are received at a Graphical User Interface (GUI) displayed by a financial application. At a user's indication, the financial application obtains pricing data regarding each of the line items of the estimate from a pricing server that collects data from suppliers and populates the GUI with the prices of the items within the pricing estimate. The pricing estimate is then calculated using the obtained prices and by applying the pricing rule(s). A total estimated cost may then be used or shown to customers.

FIG. 1 shows a flow diagram of a system in accordance with one or more embodiments of the invention. As shown in FIG. 1, the system (100) includes a Supplier A (102A), a Supplier N (102N), a Pricing Server (104), a Pricing Engine (106), a Data Repository (108), a Client Device A (110A), a Client Device N (110N), a Financial Application A (112A), and a Financial Application N (112N). Each of the aforementioned components of FIG. 1 is discussed below.

Supplier A (102A) and Supplier N (102N) may be any supplier, vendor, wholesaler, retailer, or other entity that sells a product or service. In one or more embodiments of the invention, Supplier A (102A) and Supplier N (102N) are communicatively connected with Pricing Server (104). Supplier A (102A) and Supplier N (102N) may use a computer, cell phone, e-mail, web-browser, or any other suitable method to communicate with Pricing Server (104). Supplier A (102A) and Supplier N (102N) may also use a financial application (such as the one used by Client Device A (110A) or Client Device N (110N)) (not show) to store financial information, including inventory and pricing data. In one or more embodiments of the invention, the financial information (including inventory and pricing information) is shared with Pricing Server (104). Furthermore, in one or more embodiments of the invention, one or more of the suppliers (e.g., Supplier A (102A) and Supplier N (102N)) enter into an agreement to share the financial information (including inventory and pricing data) via a server (e.g., Pricing Server (104)).

In one or more embodiments of the invention, Supplier A (102A) and/or Supplier N (102N) may have a pre-existing agreement in place regarding the product(s) and/or service(s) they offer for sale that is stored (e.g., on the data repository (108)) on the Pricing Server (104). For example, Supplier A (102A) and/or Supplier N (102N) may have negotiated a transaction to sell an amount of product "x" at a set price. In one or more embodiments of the invention, the price may be time sensitive, quantity sensitive, or sensitive to any other variable involved in a pricing estimate.

In one or more embodiments of the invention, Supplier A (102A) and/or Supplier N (102N) provides all the necessary data to the Pricing Server (104) to allow the information stored on the Pricing Server (104) and to be searched by the Pricing Engine (106) based on any suitable factor. For example, the data provided to the Pricing Server (104) may include business location, business hours, shipping rates, item prices, item quality, manufacturer data, warranty data, and any other related data. In one or more embodiments of the invention, Supplier A (102A) and/or Supplier N (102N) may access the Pricing Server (104) to advertise or bid on supply contracts. When Supplier A (102A) and/or Supplier N (102N) bid on supply contracts, the bid may be legally binding so that the bid may be used by the Pricing Server (104) to provide reliable pricing data. It will be apparent to one of ordinary skill in the art that this is not an exhaustive listing of data that may be provided by suppliers (i.e., Supplier A (102A) and Supplier N (102N)) to the Pricing Server (104) or ways to supply the pricing data and, as such, the invention should not be limited to the above examples.

The Pricing Server (104) is any server, computer, or other device capable of processing data and executing a Pricing Engine (106) in accordance with one or more embodiments of the invention. In one or more embodiments of the invention, the Pricing Server (104) is in the form of the computer system shown in FIG. 4 and described below. In one or more embodiments of the invention, the Pricing Server (104) has an associated Data Repository (108). The Data Repository (108) may store any data needed by the Pricing Server (104), and any data related to or needed by Pricing Engine (106). For example, the Data Repository (108) may store data related to a particular supplier (i.e., Supplier A (102A) or Supplier N (102N)), such as business location, items sold, prices, and other relevant data. In one or more embodiments of the invention, the Pricing Server (104) is communicatively connected to allow communication with Supplier A (102A), Supplier N (102N), Client Device A (110A), and Client Device N (110N).

The Pricing Engine (106) may be a software application executing on Pricing Server (104). In one or more embodiments of the invention, the Pricing Engine (106) includes functionality for gathering pricing data from a plurality of suppliers. Pricing Engine (106) may gather the pricing data from online or printed publications, the Internet (using web crawlers, bots, searching algorithms, etc.), from a financial application executed by the supplier or the supplier's agent, through negotiations with individual suppliers, or suppliers may provide the data directly to Pricing Engine (106).

The pricing data may include data about the item (in the form of one or more line items) such as price, model number, manufacturer, warranty, a quality, notes, availability, and other relevant information. Additionally, the pricing data may include data about the supplier businesses such as location, size, phone number, website, and other suitable information. In one or more embodiments of the invention, the Pricing Engine (106) is configured to aggregate and organize pricing data from a multitude of suppliers. The aggregated pricing data is then able to be searched. In one or more embodiments of the invention, the Pricing Engine (106) is able to receive requests to search the aggregated pricing data, search the aggregated pricing data, and send the result to the requestor (e.g., Client Device A (110A) or Client Device N (110N)).

In one or more embodiments of the invention, the Pricing Engine (106) is capable of filtering the data based on location, quality, expiration dates, or other factors. Alternatively, the financial application (e.g., Financial Application A (112A) or Financial Application N (112N) on the client's computer (e.g., Client Device A (110A) or Client Device N (110N)) may search and/or filter the data. In one or more embodiments of the invention, all pricing data within the Pricing Engine (106) has an expiration date (i.e., is guaranteed for a certain period). In other words, the prices returned by Pricing Engine (106) are guaranteed to be honored until the expiration date passes. The expiration date is most likely set by the supplier; however, other parties or the Pricing Engine (106) may also set the expiration date. In one or more embodiments of the invention, the prices returned by the Pricing Engine (106) are pre-negotiated prices, with a third party representing all users (e.g., suppliers and/or consumers) of the financial application as a community, thereby allowing a lower price to be secured.

Client Device A (110A) and Client Device N (110N) may be any device able to communicate with the Pricing Server (104) and able to execute a financial application (e.g., Financial Application A (112A) and Financial Application N (112N)), such as a computer, laptop, cell phone, mobile media player, handheld gaming device, and other suitable devices. In one or more embodiments of the invention, Client Device A (110A) and Client Device N (110N) are in the form of the computer system shown in FIG. 4 and described below. In one or more embodiments of the invention, Client Device A (110A) and Client Device N (110N) may controlled by a supplier (e.g., Supplier A (102A) and Supplier N (102N)) and/or any entity needing a pricing estimate.

Financial Application A (112A) and Financial Application N (112N) may be any software application able to assist users with management of finances (e.g., personal finances, small business finances, corporate finances, etc.). In one or more embodiments of the invention, Financial Application A (112A) and Financial Application N (112N) execute directly on client devices (i.e., Client Device A (110A) and Client Device N (110N)) or is web based and/or execute on a remote machine, such as Pricing Server (104), a web server, or any other suitable host. In one or more embodiments of the invention, Financial Application A (112A) and Financial Application N (112N) displays industry specific GUIs for creating a pricing estimate. In one or more embodiments of the invention, Financial Application A (112A) and Financial Application N (112N) obtain and searches pricing data from Pricing Server (104). Financial Application A (112A) and Financial Application N (112N) may filter the pricing data based on location, quality, price, supplier, manufacturer, expiration date, or any other suitable factor. In one or more embodiments of the invention, Financial Application A (112A) and Financial Application N (112N) populates the GUI with the obtained pricing data, and calculates a pricing estimate using the obtained data and any received pricing rules. Further, Financial Application A (112A) and Financial Application N (112N) include the capacity to display a total estimated cost within the GUI and optionally send the total estimated cost to a customer using the GUI in accordance with one or more embodiments of the invention. In one or more embodiments of the invention, the total estimated cost is a number (and any additional detail(s) deemed appropriate) presented to a potential consumer of the product and/or services offered by the business. The total estimated cost may include selected data found on the pricing estimate, such as the line items (at a selected level of detail), the price (after adjusted by the pricing rule) for each line item, the quantity of each line item, the applicable tax, etc. The total estimated cost may not include the pricing rule(s) such as the desired or actual profit, the names of the suppliers, location of the suppliers, etc.

Figure 2:
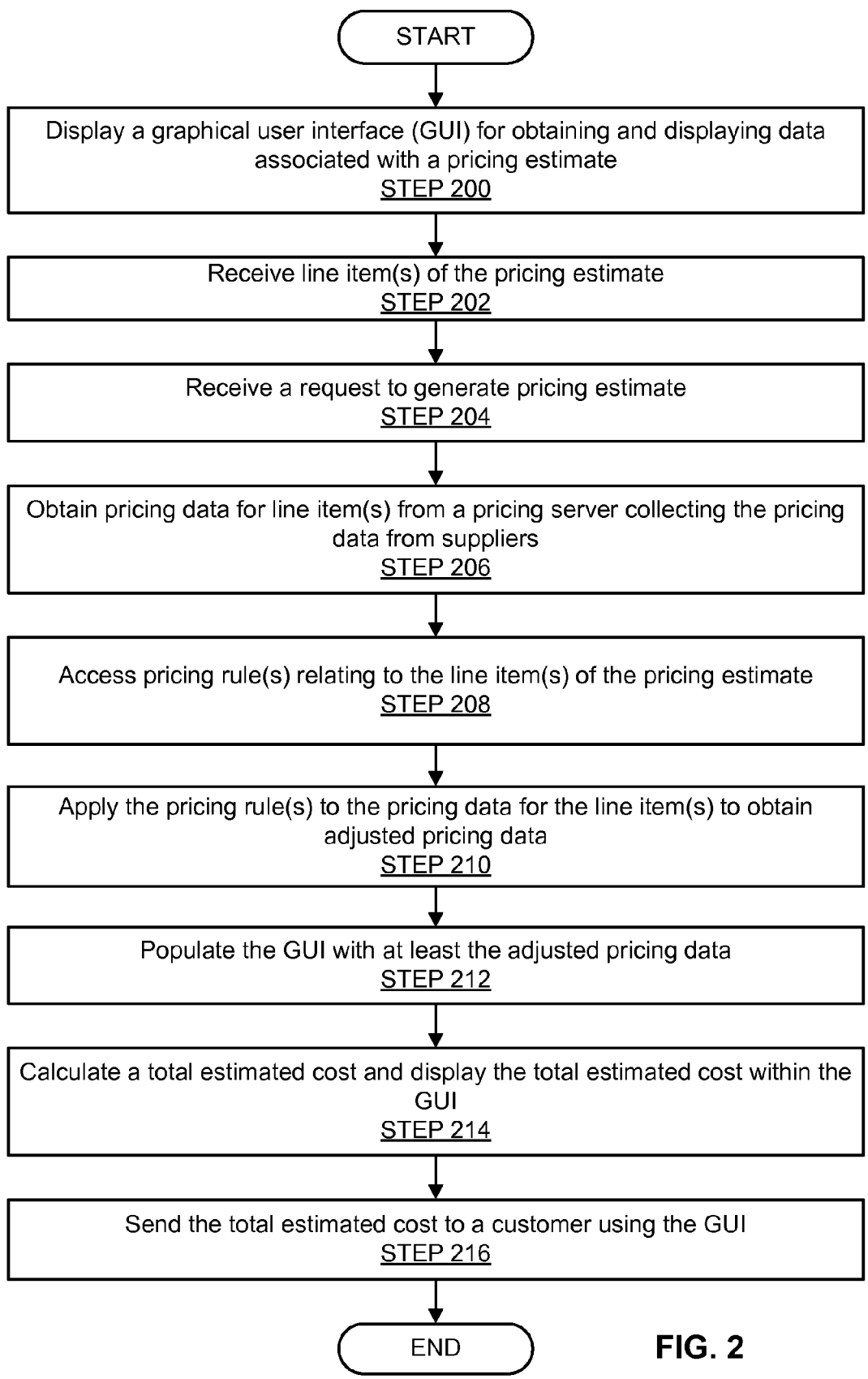
FIG. 2 shows a flow chart of a method in accordance with one or more embodiments of the invention.

FIG. 2 shows a flowchart of a method in accordance with one or more embodiments of the invention. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

In Step 200, a GUI is displayed for obtaining and displaying data associated with a pricing estimate in accordance with one or more embodiments of the invention. In one or more embodiments of the invention, the GUI is displayed on a client computer (as a desktop application, through a web browser, or a similar tool) to either a business user interested in generating a pricing estimate or the customer that requested a pricing estimate. In one or more embodiments of the invention, the displayed GUI may be different based on the intended recipient of the GUI. A different GUI may be displayed for each specific industry and/or the type of user (business, customer, supplier, etc.). For example, a user desirous of generating a pricing estimate for the construction industry would see a different GUI than someone in the dental industry, legal industry, accounting industry, or any other industry needing pricing estimates. The variation in the GUI depends on the needs and customary practice of the specific industry and is customizable. It will be apparent to one of ordinary skill in the art that the previously mentioned industries are only a few examples of the many different industries or businesses that may need to create a pricing estimate and, as such, the invention should not be limited to the above examples.

In Step 202, one or more line items of the pricing estimate are received in accordance with one or more embodiments of the invention. In one or more embodiments of the invention, the line items of the pricing estimate include(s), but are not limited to, the item to be priced, a quality of the item, a quantity of the item, an expiration date of the item (i.e., when the item is no longer available for whatever reason (e.g., shelf life, pricing, hold policy, estimated need, etc.)), when the item will be needed, a maximum distance between the location of the item and the user, preferred suppliers, and/or any other relevant factor. It will be apparent to one of ordinary skill in the art that many other factors relevant to a data item of a pricing estimate exist and, as such the invention should not be limited to the above examples. In one or more embodiments of the invention the line items may be received via selection of a drop-down menu, a list, data entry, or any other suitable methodology within the GUI. In one or more embodiments of the invention, the line items may be stored in and retrieved from a data repository as shown and described in FIG. 1. It will be apparent to one of ordinary skill in the art that there are many ways to receive data related to a pricing estimate and, as such, the invention should not be limited to the above examples.

In Step 204, a request to generate a pricing estimate is received by the pricing server in accordance with one or more embodiments of the invention. In one or more embodiments of the invention the request may be received following a selection of a button, check box, or any other suitable methodology within the GUI. The selection within the GUI may be made by a party seeking to generate the pricing estimate in accordance with one or more embodiments of the invention. It will be apparent to one of ordinary skill in the art that many ways to receive a request to generate a pricing estimate exist and, as such, the invention should not be limited to the above examples.

In Step 206, pricing data is obtained for line item(s) from a pricing server collecting the pricing data from suppliers in accordance with one or more embodiments of the invention. In one or more embodiments of the invention, the pricing data may be stored in and retrieved from a data repository as shown and described in FIG. 1. In one or more embodiments of the invention, the pricing data is obtained automatically from the pricing server in response to receiving a request to generate the pricing estimate without user intervention. In one or more embodiments of the invention, the pricing data may be filtered by the pricing server for quality, price, location, expiration date, supplier, and other factors. It will be apparent to one of ordinary skill in the art that the above list of factors is not an exhaustive list and, as such, the invention should not be limited to the above examples. Alternatively, the filtering may be performed by a financial application executing on a client device. In one or more embodiments of the invention, the prices obtained in this step include an expiration date (i.e., are guaranteed to not change until the expiration date passes). The expiration date may vary by supplier, by product, or any other relevant factor. For example, a returned price on one item may be guaranteed not to expire for three days while another product may expire in five days. It will be apparent to one of ordinary skill in the art that this is not an exhaustive listing of expiration dates or of the conditions involved with the expiration date and, as such, the invention should not be limited to the above examples.

In one or more embodiments of the invention, the pricing data may come from prior suppliers, industry publications, web crawlers searching the Internet, data stored in financial applications, new suppliers, etc. In one or more embodiments of the invention, the pricing data may contain pre-negotiated prices. The pre-negotiated prices may be negotiated by a third party representing all users of the financial application and/or suppliers as a community (or group), thereby acting as a large purchasing entity able to demand a lower price.

In Step 208, a pricing rule related to the line item(s) of the pricing estimate is accessed in accordance with one or more embodiments of the invention. In one or more embodiments of the invention, a pricing rule related to the line item(s) of the pricing estimate include, but are not limited to, adding a set amount to the price estimate, adding a percentage to the price estimate, special discounts available to the user at certain suppliers, a maximum distance an item may be from the user, a duration the price needs to be guaranteed for, or any other relevant aspect. It will be apparent to one of ordinary skill in the art that many different pricing rules may exist and, as such, the invention should not be limited to the above examples.

In one or more embodiments of the invention, the pricing rule(s) may be received via selection of a drop-down menu, a list, data entry, or any other suitable methodology within the GUI. In one or more embodiments of the invention, the pricing rules may be stored in and retrieved from a data repository as shown and described in FIG. 1. It will be apparent to one of ordinary skill in the art that there are many ways to receive rules related to a pricing estimate and, as such, the invention should not be limited to the above examples.

In Step 210, one or more pricing rules are applied to the pricing data for each of the line items (or the total of all line items) to obtain adjusted pricing data in accordance with one or more embodiments of the invention. In one or more embodiments of the invention, the adjusted pricing data may be stored in and retrieved from a data repository as shown and described in FIG. 1.

In one or more embodiments of the invention, the pricing rules accessed in Step 208 are applied to the pricing data obtained in Step 206 through a series of one or more calculations and/or adjustments to obtain the adjusted pricing data. For example, a set amount may be added to the obtained price, the obtained priced is adjusted to reflect a percentage increase, the obtained price is adjusted to reflect a special discounts available to the user at certain suppliers, a material is substituted and the price adjusted based on a maximum distance an item may be from the user, a material is substituted and the price adjusted based on an expiration date, or any other relevant manipulations to result in adjusted pricing data. The adjusted pricing data may be obtained for each line item individually, one or more combinations of line items, or the total of all line items. For example, if the total price of all line items was $100, and the applicable pricing rule is to "increase total price by 25% for profitability," then the adjusted pricing data generated would be $125 for the total of all line items. Similarly, if the applicable pricing rule is to that "the cost of pavers is reduced $1 per paver (the actual reduction is $2 per paver but only $1 is passed along to the customer) when you use ABC Supplier for the sand and DEF Bricklayers for the labor of installing pavers", then cost of the sand and labor remains constant based on the obtained pricing data from the pricing server while the adjusted pricing data for the paver will be reduced by $1 each.

In one or more embodiments of the invention, the adjusted pricing data is determined once a supplier is selected automatically (based on the applicable pricing rule(s) and other selection logic) for each line item. Alternatively, a user may be presented with a listing of all available suppliers, and may select her own supplier, or may override a best selection by making a selection of her own.

In Step 212, the GUI is populated with at least the adjusted pricing data in accordance with one or more embodiments of the invention. In one or more embodiments of the invention, each line item in the pricing estimate is populated with at least the adjusted pricing data, but could additionally be populated with the pricing data obtained in Step 206 (prior to the pricing rule(s) being applied). It is important to note that if no adjustment is made to the pricing data obtained in Step 206, then the pricing data obtained in Step 206 is populated as the adjusted pricing data. In such a case, if the GUI is populated by both the adjusted pricing data and the pricing data, then the adjusted pricing data and the pricing data would be identical.

In one or more embodiments of the invention, multiple pricing estimates with multiple different pricing data and/or adjusted pricing data may be populated using different suppliers or scenarios. For example, a low, medium, and high quality pricing estimate could be populated for each line item to potentially provide the customer with increased options and visibility into the pricing process. It will be apparent to one of ordinary skill in the art that there are a variety of ways to populate a pricing estimate and, as such, the invention should not be limited to the above example.

In Step 214, a total estimated cost is calculated and displayed within the GUI. In one or more embodiments of the invention, the total estimated cost is calculated by summing the adjusted pricing data for each line item together for a particular pricing estimate. Again, as discussed above, it is important to note that if no adjustment is made to the pricing data obtained in Step 206, then the pricing data obtained in Step 206 is populated as the adjusted pricing data. Also, as discussed above, in one or more embodiments of the invention, multiple pricing estimates may be generated and thus multiple total cost estimates are calculated by summing the adjusted pricing data for each line item within each pricing estimate.

In one or more embodiments of the invention, the total estimated cost may be displayed in a different format than the industry-specific GUI for receiving pricing data or the pricing estimate that is generated with the pricing data and/or the adjusted pricing data. In one or more embodiments of the invention, the total estimated cost may contain a total price, a breakdown of the components, or any other relevant data. It will be apparent to one of ordinary skill in the art that there are a variety of ways to display the total estimated cost and, as such, the invention should not be limited to the above examples.

In Step 216, in one or more embodiments of the invention, the total estimated cost is optionally sent to a customer using the GUI. The total estimated cost may be sent once selected within the GUI using e-mail, a link to a website, verbally, postal mail, or any other suitable method. In one or more embodiments of the invention, the total cost estimate sent to a customer may be different than the pricing estimate displayed to the user of the financial application. For example, extraneous data may be removed to simplify the pricing estimate, such as data relating to a supplier of an individual component of the pricing estimate.

FIGS. 3A and 3B show examples in accordance with one or more embodiments of the invention. Specifically, the example in FIG. 3A shows a GUI for creation of a pricing estimate. The example in FIG. 3B shows the same GUI after the pricing estimate has been populated. The GUIs shown in FIGS. 3A and 3B are simplified to ease explanation, and as such, the invention should not be limited to the examples of FIGS. 3A and 3B.

FIG. 3A shows a GUI for creation of a "Pricing Estimate for Construction Job #56734." In this example, the GUI is specific to the construction industry.

FIG. 3A shows fields for entering items to be priced (i.e., Line Item 1 (302) field and Line Item 2 (308) field), quantities of the items (i.e., Quantity 1 (304) field and Quantity 2 (310) field), an empty field for displaying the price of the items (i.e., Price 1 (306) field and Price 2 (312) field), a pricing rule (i.e., Pricing Rule (314) field), an empty field for displaying the total estimated cost (i.e., Total Estimated Cost (318) field), and buttons for generating the prices and estimated cost (i.e., Find Cost/Price (316) button) and to send the total estimated cost to the customer (i.e., Send to Customer (317) button).

Continuing with FIG. 3A, Line Item 1 (302) field is already entered or selected by the user as "Concrete—Materials." Further, the user has entered or selected "500 lbs" in the Quantity 1 (304) field. In one or more embodiments of the invention, this data is used by the financial application to gather appropriate pricing data when then user requests a pricing estimate by selecting the Find Cost/Price (316) button. Optionally, more fields may exist for entering or selecting more data about the particular item, but those are not shown in this example for simplicity.

The Price 1 (306) field, associated with the Item 1 (302) field, is empty because the field will be automatically populated by the financial application when the user requests a pricing estimate by selecting the Find Cost/Price (316) button. Similar to the Line Item 1 (302) field, the Line Item 2 (308) field is already entered or selected by the user, but this time the item is a service, namely "Renting a front-end loader—Equipment Rental." The Quantity 2 (310) field is the duration of time the user expects to rent the front end loader, which in this case is for "1 day." As with the Price 1 field above, the Price 2 (312) field is also empty because the field will be automatically populated by the financial application when the user requests a pricing estimate by selecting the Find Cost/Price (316) button. It will also be apparent to the user that any number of items and any number of additional data fields may be entered about the items and, as such, the invention should not be limited to the above example.

Continuing with FIG. 3A, the Pricing Rule (314) field, which is entered or selected by the user to state the rule: "[i]ncrease price by 20% for materials but not equipment rental." It will be apparent to one of ordinary skill in the art that the Pricing Rule (314) may be many changes and be specific to one or more rules developed over time and, as such, the invention should not be limited to the above example. The Find Cost/Price (316) button allows the user to request that the financial application obtain pricing data for the entered items (i.e., Line Item 1 (302) and Line Item 2 (308)) and populate the Pricing Estimate with such pricing information (both pricing from the pricing server and/or pricing adjusted by the pricing rule) and also calculate a total estimated cost to be displayed in the Total Estimated Cost (318) field.

As we progress from FIG. 3A to FIG. 3B, the user has now selected the Find Cost/Price (316) button to trigger the financial application obtain pricing data. Next, the financial application obtains the pricing data for each line item from a pricing server. The pricing server may be operated by a third party, and may store financial data related to pricing of items and services needed for various industries to create pricing estimates in accordance with one or more embodiments of the invention. In one or more embodiments of the invention, the third party may negotiate with suppliers as a large entity representing all the users of the financial application, thereby securing a lower price. Further, the prices obtained from the pricing server may contain an expiration date (indicating the price is guaranteed until a certain date). For example, the prices may be guaranteed not to expire for a few days, a week, or more. In one or more embodiments of the invention, the pricing data is filtered by the pricing server. Alternatively, the financial application may filter the pricing data.

Turning to FIG. 3B, a few new components are found that did not appear in FIG. 3A and, as such, a description of those components are now provide; however, the common components are not repeated. The new components include the Adjusted Price 1 (307) field and the Adjusted Price 2 (313) filed. These fields are populated with the price after applying the pricing rule(s) (if any) associated with the Pricing Estimate.

Continuing with FIG. 3 B, the price fields (i.e., Price 1 (306), Adjusted Price 1 (307), Price 2 (312), Adjusted Price 2 (313), and Total Estimated Cost (318)) of the GUI shown in FIG. 3B is now populated with data obtained from the pricing server and adjusted based on the pricing rule. As shown, the pricing data obtained from the pricing server indicates that 500 pounds of concrete costs $75 (as shown in the Price 1 (306) field), while renting a front end loader for 1 day costs $510 (as shown in the Price 2 (312) field). Upon applying the pricing rule shown in the Pricing Rule (314) field, the adjusted prices are shown as $90 (as shown in the Adjusted Price 1 (307) field) for the concrete (which is a 20% reduction) and $510 (as shown in the Adjusted Price 2 (313) field) for the front-end loader rental (which is identical to the price obtained from the pricing server because the rule did not adjust this amount). Of course, unlike this example, if the pricing rule only applied to the total price of all line items, then the rule would only be applied once.

Once the GUI is populated with the pricing data and the adjusted pricing data, the total estimated cost may be calculated and displayed within the Total Estimated Cost (318) field. In this example, the total estimated cost is $600 calculated by summing the value of the Adjusted Price 1 (307) field ($90) and the Adjusted Price 2 (313) field ($510). Accordingly, the total estimated cost displayed within the Total Estimated Cost (318) field is $600. Once the total estimated cost is established, the preparer of the pricing estimate may press the Send to Customer (317) button to send the total estimated cost to the customer. In its simplest form, the total estimated cost is simply a number; however, the total estimated cost may also include selected data found on the pricing estimate, such as the line items (at a selected level of detail), the price (after adjusted by the pricing rule) for each line item, the quantity of each line item, the applicable tax, etc. The total estimated cost would not include the pricing rule(s) such as the desired or actual profit, the names of the suppliers, location of the suppliers, etc.

Figure 4:
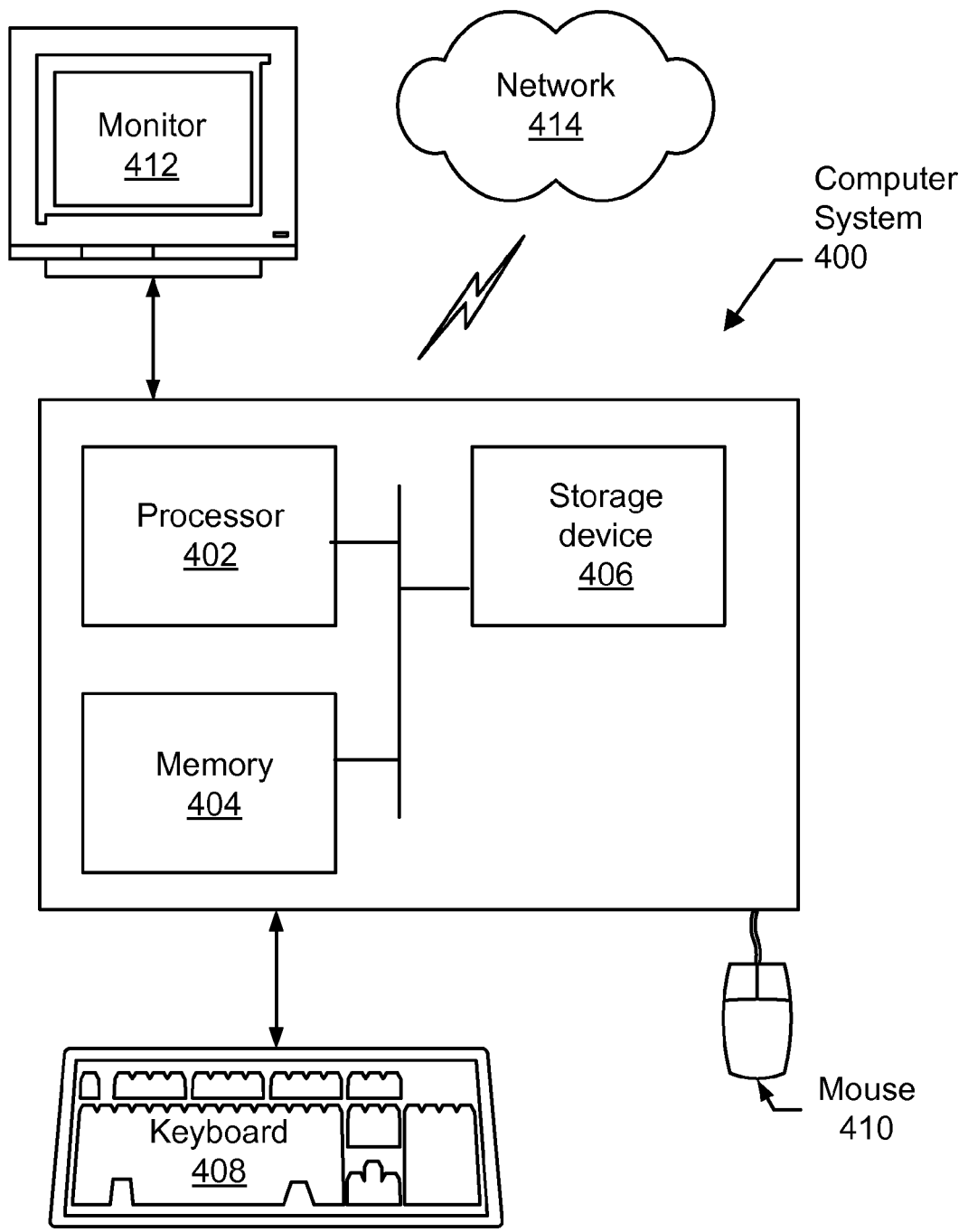
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), an integrated circuit, etc., associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (400) includes at least the minimal processing, input, and/or output means necessary to particularly practice embodiments of the invention.

Further, those skilled in the art will appreciate that one or more elements of the aforementioned computer system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a memory stick, solid state storage, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a pricing estimate for a customer of a small business, comprising:
    displaying, by a financial application executing on a processor and configured to manage finances for the small business, a graphical user interface (GUI) comprising a GUI widget loaded with a plurality of line items corresponding to an industry of the small business;
    receiving, from a user associated with the small business and operating the financial application, a selection of a first line item and a second line item using the GUI widget;
    receiving, from the user, a request to generate the pricing estimate for at least the first line item and the second line item;
    obtaining, by the financial application and from a pricing server operatively connected to the financial application, a plurality of pricing data comprising a first price for the first line item and a second price for the second line item, wherein the pricing server collects the plurality of pricing data from a plurality of suppliers who agree to share the pricing data;
    accessing a pricing rule specifying a profit percentage to be applied to the first price to increase profitability of the small business;
    applying, by the financial application, the pricing rule to the first price for the first line item to obtain an adjusted price;
    populating the GUI with at least the first price, the second price, and the adjusted price;
    calculating, by the financial application, the pricing estimate based on the adjusted price and the second price;
    displaying, by the financial application, the pricing estimate within the GUI; and
    sending, by the financial application, the pricing estimate to a customer of the small business.

2. The method of claim 1, further comprising:
    filtering the plurality of pricing data based on a plurality of qualifying criteria.

3. The method of claim 2, wherein the plurality of qualifying criteria comprises at least one from a group consisting of a quality, a price, and a rating of a supplier of the plurality of suppliers.

4. The method of claim 1, wherein the plurality of suppliers agree to share the pricing data via the pricing server.

5. The method of claim 1, wherein the pricing server collects the plurality of pricing data prior to the request.

6. The method of claim 5, wherein the pricing server uses a web crawler to collect the plurality of pricing data from the plurality of suppliers.

7. The method of claim 5, wherein the plurality of pricing data comprises an expiration date.

8. The method of claim 1, wherein the first line item is a service.

9. The method of claim 1, wherein the second line item comprises a quantity and a description.

10. A non-transitory computer readable storage medium storing a plurality of computer executable instructions for generating a pricing estimate for a customer of a small business, the plurality of computer executable instructions comprising functionality to:
    display, using a financial application configured to manage finances for a small business, a graphical user interface (GUI) comprising a GUI widget loaded with a plurality of line items corresponding to an industry of the small business;
    receive, from a user associated with the small business and operating the financial application, a selection of a first line item and a second line item using the GUI widget;
    receive, from the user, a request to generate the pricing estimate for at least the first line item and the second line item;
    obtain, using the financial application and from a pricing server operatively connected to the financial application, a plurality of pricing data comprising a first price for the first line item and a second price for the second line item, wherein the pricing server collects the plurality of pricing data from a plurality of suppliers who agree to share the pricing data;
    access a pricing rule specifying a profit percentage to be applied to the first price to increase profitability of the small business;
    apply, using the financial application, the pricing rule to the first price for the first line item to obtain an adjusted price;
    populate the GUI with at least the first price, the second price, and the adjusted first price;
    calculate, using the financial application, the pricing estimate based on the adjusted price and the second price;
    display the pricing estimate within the GUI; and
    sending, using the financial application, the pricing estimate to a customer of the small business.

11. The non-transitory computer readable storage medium of claim 10, wherein the plurality of computer executable the instructions further comprising functionality to:
    filter the plurality of pricing data based on a plurality of qualifying criteria.

12. The non-transitory computer readable storage medium of claim 10, wherein the plurality of suppliers agree to share the pricing data via the pricing server.

13. The non-transitory computer readable storage medium of claim 10, wherein the pricing server collects the plurality of pricing data prior to the request.

14. The non-transitory computer readable storage medium of claim 13, wherein the pricing server uses a web crawler to collect the plurality of pricing data from the plurality of suppliers.

15. The non-transitory computer readable storage medium of claim 13, wherein the plurality of pricing data comprises an expiration date.

16. A system for generating a pricing estimate for a customer of a small business, comprising:
   a pricing server configured to collect a plurality of pricing data from a plurality of suppliers; and
   a client hardware device executing a financial application configured to manage finances of the small business and comprising functionality to:
      display a graphical user interface (GUI) comprising a GUI widget loaded with a plurality of line items associated with an industry of the small business;
      receive one or more line items of the pricing estimate, wherein the one or more line items require pricing information;
      receive, from a user associated with the small business and operating the financial application, a selection of a first line item and a second line item using the GUI widget;
      receive, from the user, a request to generate the pricing estimate for at least the first line item and the second line item;
      obtain, in response to receiving the request, the plurality of pricing data comprising a first price for the first line item and a second price for the second line item from the pricing server wherein the pricing server collects the plurality of pricing data from suppliers who agree to share the pricing data;
      access a pricing rule specifying a profit percentage to be applied to the first price to increase profitability of the small business;
      apply the pricing rule to the first price to obtain an adjusted price;
      populate the GUI with at least the first price, the second price, and the adjusted price;
      calculate the pricing estimate based on the adjusted price and the second price;
      display the pricing estimate within the GUI; and
      send the pricing estimate to the customer.

17. The system of claim 16, wherein the plurality of suppliers agree to share the data via the pricing server.

18. The system of claim 16, wherein the pricing server is further configured to collect the plurality of pricing data prior to the request.

19. The system of claim 16, wherein the pricing server is further configured to use a web crawler to collect the plurality of pricing data from the plurality of suppliers.

20. The system of claim 16, wherein the plurality of pricing data comprises an expiration date.

* * * * *